(12) United States Patent
Jung et al.

(10) Patent No.: US 8,138,275 B2
(45) Date of Patent: Mar. 20, 2012

(54) ANTI-FINGERPRINT COATING MATERIAL FOR STAINLESS STEEL OUTER CASE OF HOME APPLIANCE

(75) Inventors: Dong-Ju Jung, Changwon (KR); Hyun-Woo Jun, Changwon (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 12/709,675

(22) Filed: Feb. 22, 2010

(65) Prior Publication Data

US 2010/0216929 A1    Aug. 26, 2010

Related U.S. Application Data

(63) Continuation of application No. PCT/KR2008/005452, filed on Sep. 16, 2008.

(30) Foreign Application Priority Data

Dec. 5, 2007  (KR) .................. 10-2007-0125780

(51) Int. Cl.
*C08G 77/02*  (2006.01)

(52) U.S. Cl. ...................................... 525/474

(58) Field of Classification Search .................... 525/474
See application file for complete search history.

(56) References Cited

U.S. PATENT DOCUMENTS

| 4,546,018 A | 10/1985 | Ryuzo et al. | |
| 2004/0137238 A1* | 7/2004 | Clerici et al. | ................. 428/446 |

FOREIGN PATENT DOCUMENTS

| JP | 2001-271173 A | 10/2001 |
| KR | 10-1995-0008722 A | 4/1995 |
| KR | 10-0262494 B1 | 8/2000 |
| KR | 10-2007-0068199 A | 6/2007 |

* cited by examiner

*Primary Examiner* — Kuo-Liang Peng
(74) *Attorney, Agent, or Firm* — Birch, Stewart, Kolasch & Birch, LLP

(57) ABSTRACT

Provided is an anti-fingerprint coating material for a stainless steel outer case of a home appliance. The coating material includes: polysilicate having 27.6 parts by weight to 36.2 parts by weight; one of epoxy resin and vinyl resin having less than 10.6 parts by weight; colloidal silica having 21.2 parts by weight to 42.6 parts by weight; and an additive having less than 10.6 parts by weight and including at least one hydrophile material selected from the first group consisting of —OH, —$NH_2$, and —COOH and at least one hydrophobic material selected from the second group consisting of —$C_nF2_{n+1}$ and —$SiR_3$.

5 Claims, 5 Drawing Sheets

[Fig. 1]
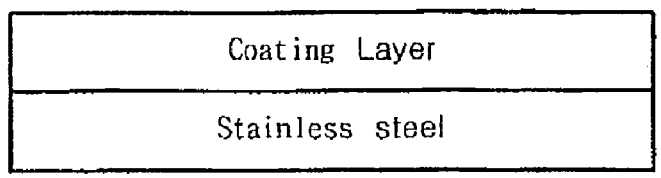
[Fig. 2]
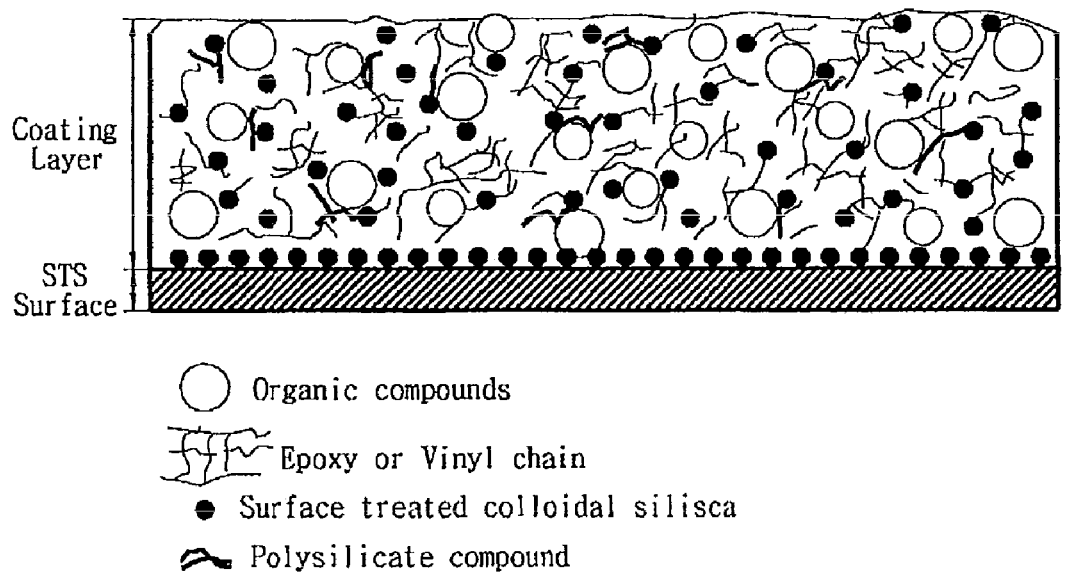
○ Organic compounds
〰 Epoxy or Vinyl chain
● Surface treated colloidal silisca
〜 Polysilicate compound

[Fig. 3]
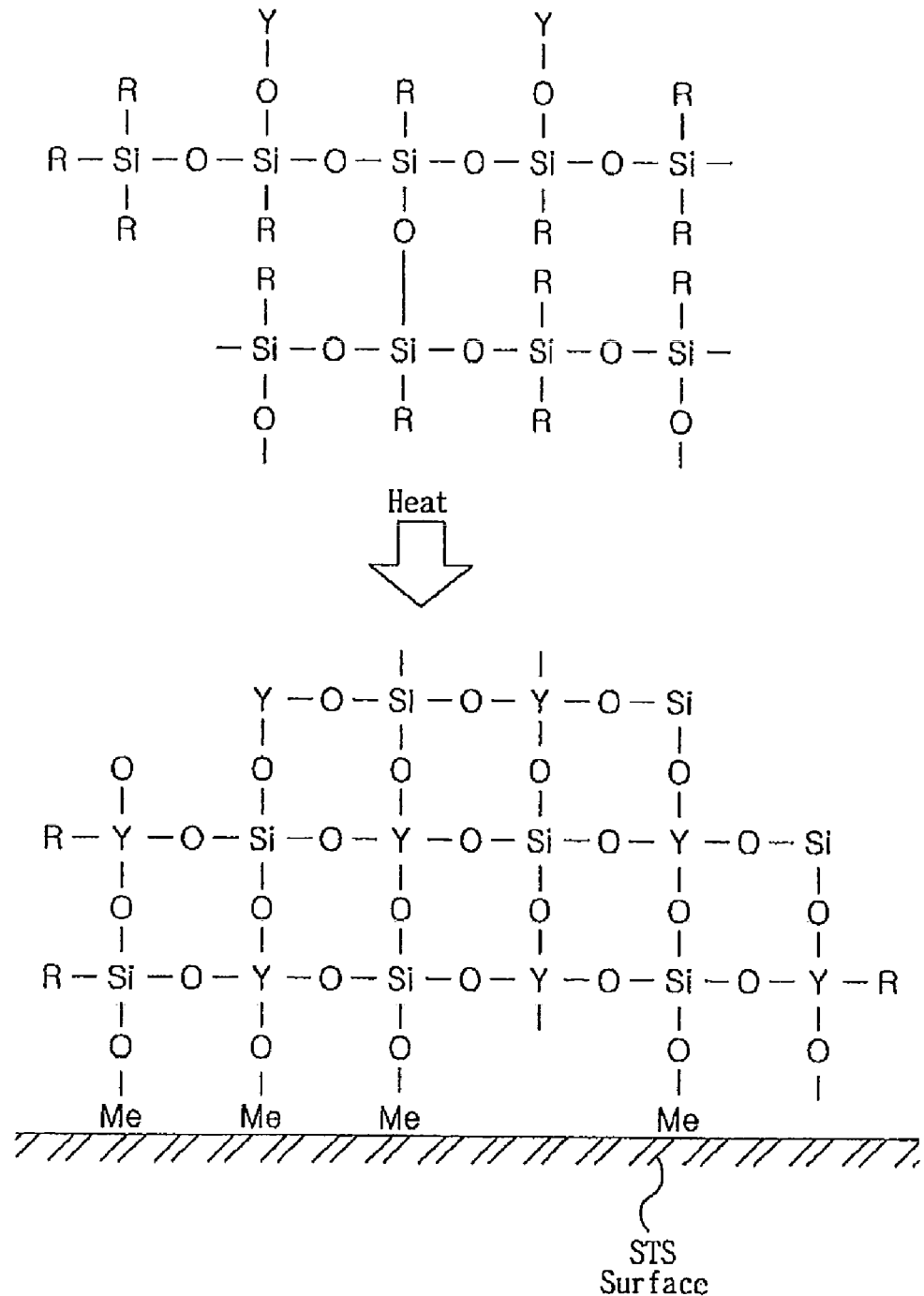

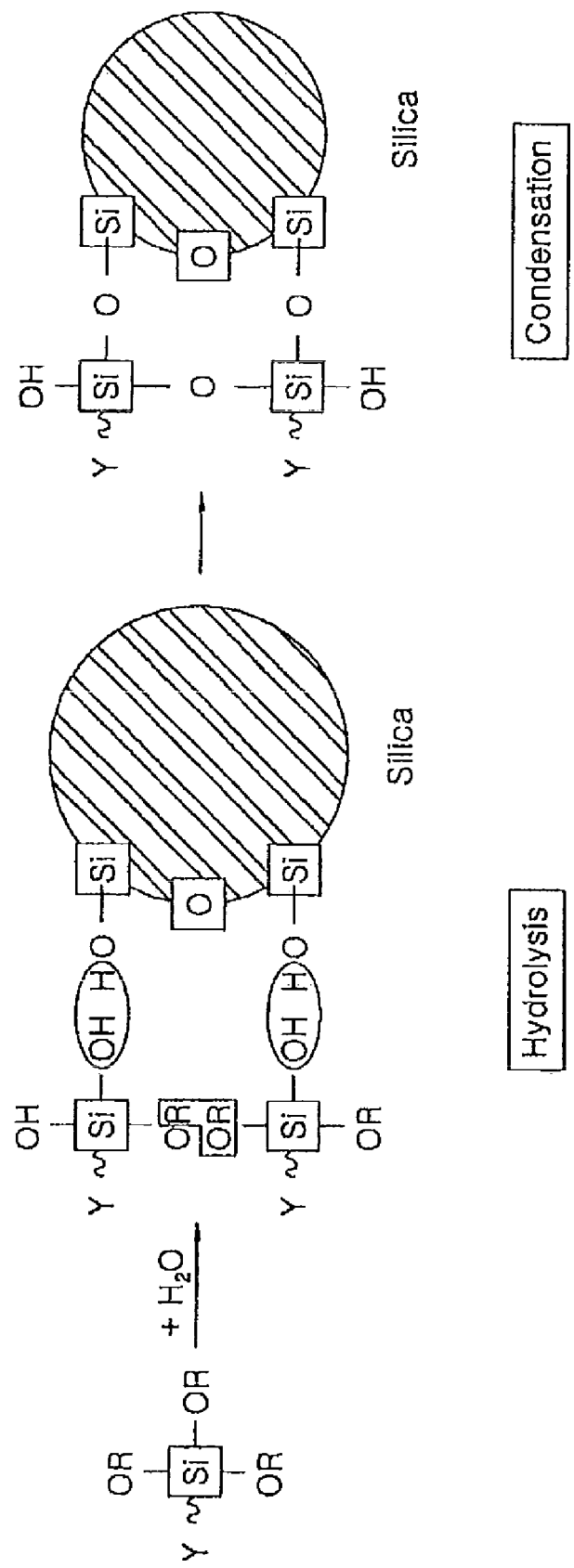
[Fig. 4]

[Fig. 5]
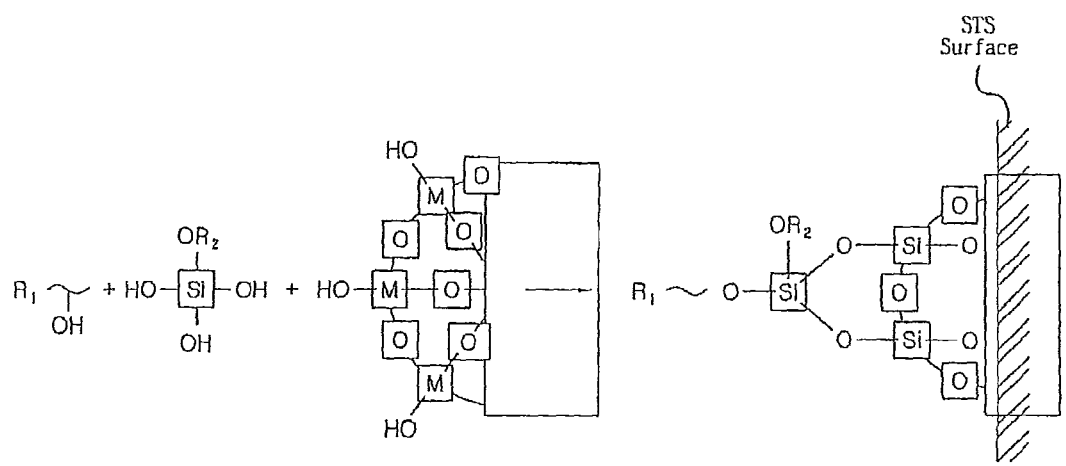

[Fig. 6]
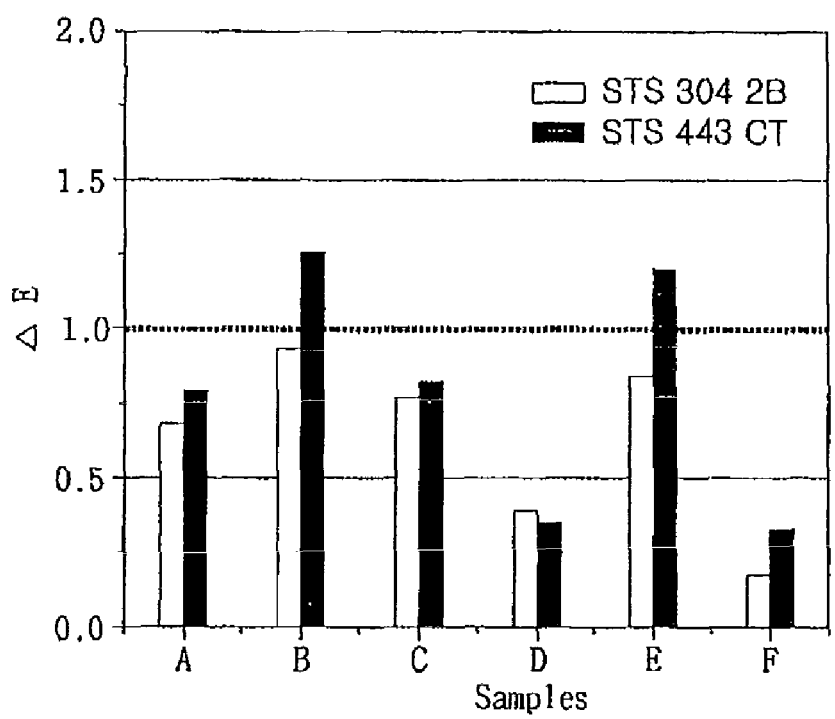
[Fig. 7]
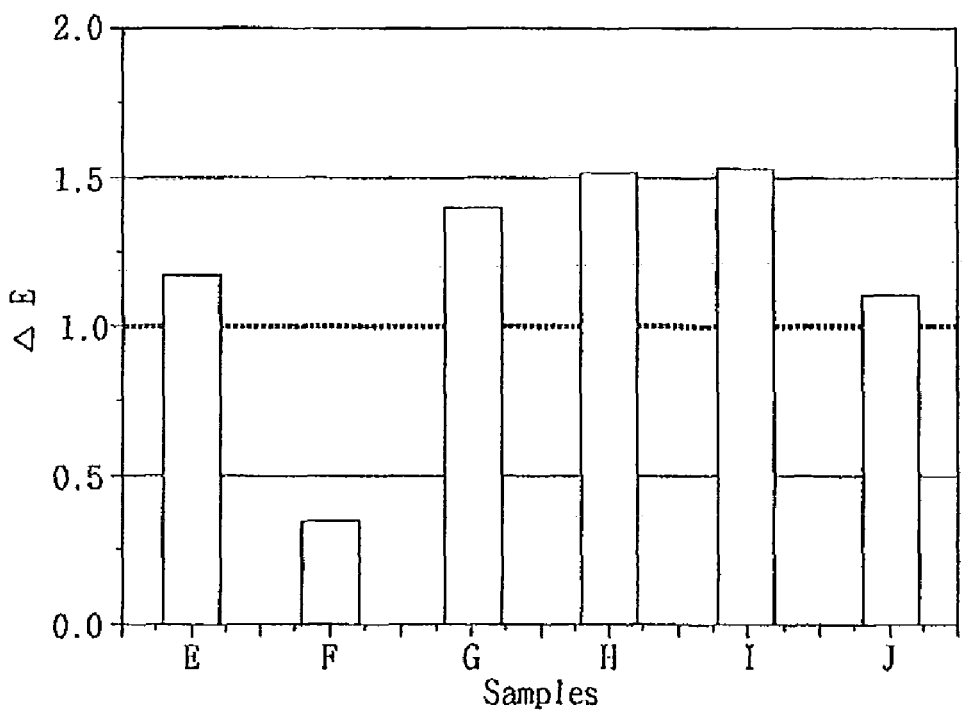

ANTI-FINGERPRINT COATING MATERIAL FOR STAINLESS STEEL OUTER CASE OF HOME APPLIANCE

This application is a Continuation of International Patent Application No. PCT/KR2008/005452, filed on Sep. 16, 2008, which claims priority to Korean Application No. 10-2007-0125780, filed on Dec. 5, 2007, all of which are herein incorporated by reference in their entireties.

TECHNICAL FIELD

The present disclosure relates to an anti-fingerprint coating material for a stainless steel outer case of a home appliance.

In more detail, the present disclosure relates to an anti-fingerprint coating material for a stainless steel outer case of a home appliance, which is capable of improving an intrinsic corrosion-resistance that stainless steel has by containing an organic component and an inorganic component in a coating layer formed on the stainless steel, and also capable of enhancing anti-fingerprint and scratch-resistance.

BACKGROUND ART

Recently, since stainless steel is applied to an outer case of important home appliances, premium products having the feel of metal and sturdiness are becoming a main trend. However, an outer case formed of a stainless steel becomes unclean easily because of fingerprints, for example. To prevent this, coating for protection is required.

A typically applied coating layer is formed of a polymer (e.g., acrylic or urethane) that is applied on the surface of a stainless steel. Urethane polymer can be obtained by the reaction of a polyol-based compound and isocyanate. An adequate catalyst and hardener are commonly added during the reaction. Through the reaction of a polyol-based compound and isocyanate, the urethane polymer is synthesized and, because its reaction of amine and isocyanate is fast enough, no catalyst is not required.

The urethane polymer has an excellent abrasion-resistance such that it contributes to an additional chemical combination of a carbonyl group (c=o) in a urethane chemical combination. Moreover, the urethane polymer has compression strength because of strong heat-resistance and outstanding three-dimensional stability. The urethane polymer also has characteristics such as elasticity, acid-resistance, alkali-resistance, chemical-resistance, and ultraviolet ray-resistance. Furthermore, urethane polymer does not pollute environment and is not affected by a temperature. Thus, the urethane polymer is not limited by temperatures even in winter.

A urethane resin is applied on a steel sheet or an aluminum sheet in order to protect its surface from scratches or is used for providing chemical resistance. If solid contents of the urethane resin is less than 10% weight, salt water resistance for penetration of corrosive ions and chemical resistance for penetration of chemical materials are not sufficient such that chemical resistance and alkaline resistance are deteriorated. Furthermore, in order to enhance high temperature and humidity resistance and freezing resistance, an acrylic resin is added or is copolymerized with the urethane resin.

Each above-mentioned component is melted in a solvent in order to form a coating liquid, and then is applied on the surface of stainless steel. Then, a drying process is performed on the result. The drying process is performed to remove the solvent contained during the coating process. After the drying process, a coating layer is hardened. The hardening process removes a remaining solvent of the drying process, and also hardens the coating layer.

Urethane polymer used as a coating layer material of stainless steel according to a related art is used as a coating material because of excellent characteristics such as water-resistance, chemical-resistance, and glossiness, but because polyamine constituting the urethane polymer is expensive, its applications are limited. Moreover, because the coating layer formed of only polymer has a pencil hardness of 1 H, scratches and cracks occur easily, and also because of fingerprints on the outer cases of home appliances, formed of stainless steel, it is difficult to maintain cleanliness.

Furthermore, a UV hardening method is used in a coating process. However, pigments for the coating process are expensive compared to related art pigments and also new UV hardening equipment needs to be purchased. Moreover, a hardening process may not be appropriately applied to an edge or uneven portion (i.e., not a flat portion). Additionally, a heat of a high temperature, generated in a UV lamp, may deform the external appearances of products. Furthermore, it is difficult to prevent heat deformation, and its cost is expensive.

DISCLOSURE OF INVENTION

Technical Problem

Embodiments provide a coating material for a stainless steel outer case of a home appliance capable of improving anti-fingerprint and scratch-resistance.

Embodiments also provide an anti-fingerprint coating material for a stainless steel outer case of a home appliance using an environmental friendly material and a hardening method.

Technical Solution

In one embodiment, a coating material includes: polysilicate having 27.6 parts by weight to 36.2 parts by weight; one of epoxy resin and vinyl resin having less than 10.6 parts by weight; colloidal silica having 21.2 parts by weight to 42.6 parts by weight; and an additive having less than 10.6 parts by weight and including at least one hydrophilic material selected from the first group consisting of —OH, —$NH_2$, and —COOH and at least one hydrophobic material selected from the second group consisting of —$C_nF_{2n+1}$ and —$SiR_3$.

Advantageous Effects

The anti-fingerprint coating for home appliances of the present disclosure maintains the cleanliness of an outer appearance of a stainless steel through improved anti-fingerprint and enhances product durability through improved scratch-resistance.

Additionally, because a coating process is environmental friendly and is not expensive, a stainless steel of the coating process can be extensively applied to outer cases of home appliances.

BRIEF DESCRIPTION OF THE DRAWINGS

FIG. 1 is a cross-sectional view of a stainless steel and a coating layer according to the present disclosure.

FIG. 2 is a conceptual view of an anti-fingerprint coating of a home appliance according to the present disclosure.

FIG. 3 is a structural view of an organic-inorganic hybrid film before and after a thermal treatment.

FIG. 4 is a view illustrating a process where colloidal silica in an water solution is applied for surface treatment.

FIG. 5 is a view illustrating a mechanism of forming a hydrophobic and a hydrophilic group on the surface of a coating layer.

FIG. 6 is a view illustrating chrominance of stainless steels of an anti-fingerprint coating of a home appliance according to the present disclosure.

FIG. 7 is a graph of chrominance based on an additive of anti-fingerprint coating for a home appliance according to the present disclosure.

BEST MODE FOR CARRYING OUT THE INVENTION

Hereinafter, embodiments of the present disclosure will be described in more detail with reference to the accompanying drawings.

FIG. 1 is a structural view of anti-fingerprint coating according to the present disclosure. FIG. 2 is a conceptual view of a coating layer.

Referring to FIGS. 1 and 2, polysilicate forming a coating layer has an excellent hard water softening ability and solubility and also is an environmental friendly material that does not pollute water and the environment. Moreover, colloidal silica is formed in a water solution and is widely used in beauty products or absorbents for waste water treatment because of excellent washability and no skin problem. Additionally, a builder containing polysilicate is a material that softens hard water and helps surfactant' washing function. Furthermore, because the builder is formed through a synthetic method using a special metal catalyst, hydrophilic and hydrophobic groups are formed on the surface of the coating layer with a ratio of a predetermined range. An anti-fingerprint characteristic can be achieved by combining characteristics of the hydrophilic and hydrophobic groups.

Stainless steel uses STS 304 for an outer appearance of a home appliance, and especially, STS 304 2B (#4). The STS 304 is formed of chrome 18% and nickel 8%. The STS 304 2B (#4) is the so-called austenite stainless steel without magnetism (but, there may be some magnetism after cold working) and has excellent corrosion-resistance and moldability. Moreover, thermal expansion and thermal conductivity of this stainless steel are usually 1.5 times those of a related art stainless steel. A ferrite stainless steel such as STS 443 may be equally applied.

An epoxy or vinyl resin softens the coating layer through a polymer material such that bending and cracks of the coating layer due to the molding of a stainless steel can be prevented.

In more detail, an additive having less than 10.6 parts by weight and including at least one hydrophilic material selected from the first group consisting of —OH, —NH$_2$, and —COOH and at least one hydrophobic material selected from the second group consisting of —C$_n$F$_{2n+1}$ and —SiR$_3$ is used for the coating layer. The first group additive serves as a hydrophilic group and the second group additive serves as a hydrophobic group. The additive is used for obtaining the improved anti-fingerprint and coating layer stability.

Furthermore, a polishing suppressant including at least one selected from the group consisting of TiO$_2$, Al$_2$O$_3$, and ZnO is used for controlling glossiness of the coating layer.

A specific mechanism for forming the coating layer will be described below.

First, a synthesis process equation of polysilicate is as follows.

Chemistry Figure 1

[Chem. 1]

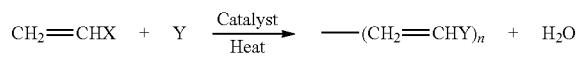

where X is one of OCOCH$_3$, Cl, OH and Y is a metal oxide precursor such as Al, Ti, Si, and so forth.

According to the present disclosure, after mixing organic compounds having Si, polysilicate is synthesized and water is created by adding an appropriate catalyst and applying a heat for reaction.

Because the synthesized polysilicate has solubility, the polysilicate and an epoxy or vinyl resin are melted together in water and then are used in a state of a water solution.

FIG. 3 is a structural view of an organic-inorganic hybrid film before and after a thermal treatment.

Referring to FIG. 3, a structural formula at the upper portion of FIG. 3 is polysilicate in a state of a water solution and is a cured coated film at a low temperature. Additionally, R represents epoxy or vinyl.

The water solution having the above-mentioned structure is coated on the surface of a stainless steel, and then heat is applied to vaporize the water. As a result, the organic-inorganic hybrid film is formed as illustrated at a lower portion of FIG. 3. As shown in FIG. 3, because a metal oxide and a coating layer, disposed on the surface of stainless steel, are chemically bonded to a certain point, the cohesiveness of the coating layer becomes very strong. This polysilicate compound is extensively distributed within the coating layer as illustrated in FIG. 2.

FIG. 4 is a view illustrating a process where colloidal silica in an water solution is applied for surface treatment.

Referring to FIG. 4, a silane coupling agent becomes silica through a hydrolysis process. The silica including a functional group is coated on the surface of a stainless steel and then heat is applied to vaporize water. Then, the surface-processed colloidal silica can be obtained as illustrated at the right of FIG. 4. This colloidal silica is extensively distributed on the stainless steel surface layer and within the coating layer such that durability of the coating layer can be achieved as illustrated in FIG. 2.

The colloidal silica having excellent stability and dispersed in water is used as inorganic silica. If a small amount of the colloidal silica is used, corrosion resistance may be deteriorated. In FIG. 4, hydrolysis occurs during an adequate surface process at the colloidal silica surface that a solvent contacts such that the colloidal silica are inductively bonded with other materials such as epoxy as illustrated in FIG. 4.

In more detail, as illustrated in FIG. 2, the colloidal silica is formed at the boundary between the stainless steel surface and the coating layer. Because of the changed colloidal silica on the stainless steel surface, the coating layer is hardened. Therefore, the durability and scratch-resistance of the coating layer are improved with a pencil hardness change from 4 H to 6 H.

FIG. 5 is a view illustrating a mechanism of forming a hydrophobic group and a hydrophilic group on the surface of a coating layer.

Referring to FIG. 5, an additive including first and second functional groups responses to a silane compound and metal salt and then occupies the surface layer of coating. The coating layer is changed to be hydrophobic and hydrophilic.

FIG. 6 is a view illustrating chrominance of stainless steels of an anti-fingerprint coating of a home appliance according to the present disclosure.

Referring to FIG. 6, a chrominance meter indicates brightness L, saturation a, and a color hue b. Chrominance is represented with $\Delta E=[(\Delta L)2+(\alpha a)2(\Delta b)2]^{1/2}$ and the chrominance $\Delta E$ represents the degree of the feeling a color difference by general people. If the chrominance $\Delta E$ is more than 1, general people may confuse one color with another. A, B, C, D, E, and F of FIG. 6 are samples having respectively different structures of anti-fingerprint coating of a home appliance. In comparison of the chrominance $\Delta E$ according to various types of stainless steels, the chrominance $\Delta E$ of STS-304 2B is measured as being lower than that of STS-443CT. Because STS-304 2B usually has the chrominance $\Delta E$ of less than 1, it is hard to notice fingerprints, and also the stainless steel of the present disclosure uses STS-304 2B.

FIG. 7 is a graph of chrominance based on an additive of anti-fingerprint coating for a home appliance according to the present disclosure.

Referring to FIG. 7, an additive is used in order to improve the anti-fingerprint and stability of a coating layer. E, F, G, H, I, and J represent samples having respectively different structures of anti-fingerprint coating for home appliance. E represents a coating layer according to the present disclosure or a coating layer without the additive. F represents a compound of E and a leveling agent EFKA 3522. G represents a coating layer containing E and fluoride CAR 30. H represents a coating layer containing E and fluoride 7005. I represents a coating layer containing E and a levelling agent EFKA 3035. J represents a coating layer containing E and wax MD 2000.

E indicates that $\Delta E$ deviates from 1 slightly and F indicates that $\Delta E$ is less than 0.5 such that it is difficult to be noticed with human eyes. G indicates that $\Delta E$ is close to 1.5 and H and I indicate that $\Delta E$ is more than 1.5 such that color difference can be identified. J indicates that $\Delta E$ is slightly more than 1.

The anti-fingerprint coating for a home appliance of the present disclosure is fabricated by melting each component in a solvent, and its stock solution is fabricated by mixing polysilicate and colloidal silica according to the present disclosure. General components such as organic matter and other hardeners and additives may be added to a resin composite. Moreover, because particles of a corrosion-resistance hardener in a coating liquid response to a resin and are distributed uniformly, stability of a resin solution has excellent stability, and also corrosion-resistance, conductivity, alkaline-resistance, high temperature and humidity resistance of the coating layer can be improved more.

The formed coating liquid may be applied on the surface of a stainless steel through various methods such as roll coating, flow coating, dipping coating, air coating, spray coating, etc. After the coating process, a drying process is performed. The dry process is performed in order to remove a solution contained during the coating process.

After the dry process, a curing process is performed on the coating layer. The curing process is performed in order to remove the remaining solution of the drying process and harden the coating layer. The curing process is an environmental-friendly thermal curing process, and is performed under conditions of a temperature of 150° C. and duration of 10 minutes to 12 minutes, such that the chrominance $\Delta E$ of the coating layer is decreased and thus anti-fingerprint characteristics can be improved. If a temperature is less than 70° C., because the hardening reaction of a resin is not sufficient, a physical property of the coating layer is deteriorated. On the contrary, If a temperature is more than 180° C., because a thermal deformation of the coating layer is accelerated, its physical property can be changed. Therefore, those situations need to be avoided.

Because a related art coating liquid is formed of only polymer, a scratch-resistance is low with a pencil hardness of 1 H, but a coating liquid of the present disclosure has excellent scratch-resistance with pencilhardness of more than 4 H.

According to the present disclosure as mentioned above, an anti-fingerprint characteristic can be improved by including polysilicate, and scratch-resistance is also improved by including colloidal silica. Epoxy and vinyl are used for obtaining flexibility of the coating layer, and by using an additive, an anti-fingerprint can be more improved and also the coating layer becomes more stable. The coating layer containing an organic component and inorganic component enhances the durability of a stainless steel and thus the reliability of products can be increased.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An anti-fingerprint coating material for a stainless steel outer case of a home appliance, comprising:
   polysilicate having 27.6 parts by weight to 36.2 parts by weight;
   at least one of an epoxy resin and a vinyl resin having less than 10.6 parts by weight and more than 0 parts by weight;
   colloidal silica having 21.2 parts by weight to 42.6 parts by weight; and
   an additive having less than 10.6 parts by weight and more than 0 parts by weight, the additive including at least one hydrophilic material selected from a first group consisting of —OH, —NH$_2$, and —COOH and at least one hydrophobic material selected from a second group consisting of —C$_n$F$_{2n+1}$ and —SiR$_3$.

2. The anti-fingerprint coating material for the stainless steel outer case of a home appliance according to claim 1, further comprising a matting agent including at least one member selected from the group consisting of TiO$_2$, Al$_2$O$_3$, and ZnO.

3. The anti-fingerprint coating material for the stainless steel outer case of a home appliance according to claim 1, further comprising a leveling agent.

4. The anti-fingerprint coating material for the stainless steel outer case of a home appliance according to claim 1, further comprising a slip agent.

5. An anti-fingerprint coating composition which comprises:
   a polysilicate;
   at least one of an epoxy resin and a vinyl resin present in an amount greater than 0 and up to less than 10.6 parts by weight;
   colloidal silica; and
   greater than 0 and up to less than 10.6 parts by weight of an additive containing at least one hydrophilic material selected from a first group consisting of —OH, —NH$_2$, and —COOH and at least one hydrophobic material selected from a second group consisting of —C$_n$F$_{2n+1}$ and —SiR$_3$.

* * * * *